United States Patent Office 3,232,971

Patented Feb. 1, 1966

3,232,971

PROCESS FOR THE PRODUCTION OF GLYCERIDES HAVING MELTING POINTS DIFFERING FROM THE STARTING GLYCERIDE MATERIAL

Werner Stein, Dusseldorf-Holthausen, Horst Rutzen, Haan, Rhineland, and Erich Sussner, Hamburg-Harburg, Germany, assignors to Henkel & Cie G.m.b.H., Dusseldorf-Holthausen, Germany, a German corporation No Drawing. Filed Feb. 5, 1962, Ser. No. 171,284
Claims priority, application Germany, Mar. 22, 1961, H 42,099
7 Claims. (Cl. 260—410.7)

This invention relates to the production of fats characterized by melting points differing from those of the originating fat material and, more particularly, to a novel process for the production of edible fats which are characterized by melting points differing from those of the original fat material.

The physical properties of fats and particularly their melting points and their characteristic behavior on melting and solidifying depend essentially on the structure and amounts of the various triglycerides present in the fats. This dependency is particularly true in the case of fats having narrow melting ranges and most particularly so in the case of the fats melting in the range of the body temperature. These latter fats constitute valuable commercial materials and are widely used in the food industry as, for example, in the production of baked goods, pastries, and chocolates, as well as for technical purposes, as, for example, in the manufacture of pharmaceuticals, such as, for instance, suppositories. A product of natural origin widely used for the above purposes is cocoa-butter which has a melting point which is comparatively sharply delineated as compared to other fat products, which melting point lies somewhat below the body temperature.

Attempts have been made to produce fats similar to cocoa-butter synthetically or, alternatively, to separate from naturally occurring fats, fractions having properties similar to those of cocoa-butter. Included in such attempts are the processes directed to changing or shifting the glyceride structure of natural fats through controlled or uncontrolled re-esterification procedures, wherein, in order to isolate the desired fraction from the re-esterification mixture, the mixture has to be subjected to treatment with organic solvents, as a result of which fat fractions are obtained in a quantity and of a glyceride structure differing from that of the originating material, as, for example, a fraction containing a high content of monoglycerides as compared to di- and triglycerides originally predominating in starting fat.

The use of solvents, however, has not proved entirely satisfactory and, in fact, creates further difficulties, as even traces of the solvent which remain act as contaminants rendering the fat unsuitable for certain purposes, as, for instance, in the food industry, and, further, the energy expenditure in the known processes—i.e., required in connection with the filtering off of the solution from the fat which has crystallized out and the subsequent solvent recovery is considerable and is not justified by the results obtained.

One of the objects of this invention is a novel process for the production of fat fractions having melting points differing from those of the originating fatty materials without the above-mentioned disadvantages.

Another object of this invention is a novel process for the production of fat fractions having a glyceride structure differing from that of the material from which it is derived.

Still another object of the invention is a novel process for the production of fat fractions having a glyceride structure differing from that of the originating fat material rendering them suitable for use for certain purposes as, for example, in the food and pharmaceutical industries.

In accordance with the invention it has been surprisingly discovered that fat fractions having melting points differing from that of the fatty material from which they are derived may be obtained in a simple, commercially feasible manner without the use of solvents if the fat product formed by re-esterifying the original fatty material in the presence of basic or metallic esterification catalysts is dispersed in water, the re-esterification catalyst being thereby converted into soap, to produce a dispersion of discrete solid and liquid fat particles in an aqueous soap solution, and thereafter subjecting the dispersion to centrifugal force whereby the dispersion is separated into a lighter or liquid fat phase and a heavier phase comprising the solid fat particles suspended in the aqueous soap solution.

The re-esterification may be "controlled" or "uncontrolled"; by "uncontrolled" re-esterification is meant a re-esterification carried out at temperatures at which the entire glyceride mixture is present in liquid form. Under such conditions there occurs a shifting of the fatty acid radicals present in the fat, which shifting may take place within the glyceride molecule itself, as well as between various glyceride molecules. In the reaction mixture, a state of equilibrium is attained—i.e., is said to exist—when the various fatty acid radicals present in the fat have become uniformly distributed on the glyceride molecules. The "controlled" re-esterification differs from the "uncontrolled" re-esterification in the working temperatures. In "controlled" re-esterification, the operation is effected using so-called low temperature catalysts and temperatures at which the higher melting glyceride molecules present in the starting glyceride mixture, or formed with the re-esterification, crystallizes out. As a result, there are removed from the re-esterification equilibrium, constituents crystallizing out at higher temperatures, and there are formed in the reaction mixture higher melting glycerides in accordance with and in proportion to the fatty acid radicals present in the liquid fat which are suitable for formation of higher melting glycerides, the latter in turn thereupon crystallizing out. This process continues to take place until a substantially saturated solution of the higher melting triglycerides exists in the liquid fat mixture and no further formation of higher melting solid fat molecules takes place.

Both the controlled and uncontrolled re-esterification reactions are known and are described in detail in their various possible executions in the literature. Reference in this connection is made to A. E. Bailey, "Industrial Oil and Fat Products," New York, 1951, pages 826–839, and to E. W. Eckey, "Vegetable Fats and Oils," New York, 1954, pages 145–149, as well as to the numerous papers and other publications therein cited.

The starting fatty materials used in the process in accordance with the invention may be of random origin. Particularly suitable are fatty materials of natural origin as, for example, triglycerides, such as palm oil, palm kernel oil, coconut oil, tallow and lard. Further, there may also advantageously be processed fractions derived from the aforesaid fats. Also suitable are natural fats of non-glyceride structure and their fractions, as, for example, sperm oil and the derivative fractions of sperm oil. Additionally, the process of the invention may be carried out with fat fractions obtained in other separation processes, as, for example, the solid fat constituents obtained in the winterization of edible oils. In place of any of the aforesaid, there may be used, as starting materials, the triglyceride fractions obtained in accordance with the invention, the melting point of which lies essentially above or below the desired fraction.

The starting material to be used is chosen so that the same per se is, or is through the mixing of various fat fractions, so composed that, in the cooling of the fat mixture, a fat fraction having as high a content of triglyceride as possible separates.

In the production of fats which are as similar as possible to the composition of natural cocoa-butter, the ratio of saturated fatty acids having 14 to 18 carbon atoms to unsaturated fatty acids and, in particular, oleic acid, in the separated fats preferably lies approximately within the range of 2:1, and, most advantageously, the mol ratio of the stearic acid, palmitic acid, and oleic acid radicals present in the starting materials should be approximately equal. The amount of completely saturated triglycerides present in the separated fats is not to be substantially greater than that occurring in natural cocoa-butter.

The catalyst which may be used for the uncontrolled or, alternatively, for the controlled re-esterification are the conventional esterification catalysts. Of particular advantage are the alcoholates of alkali and alkaline earth metals, the alcoholate being derived from lower mono- or polyvalent alcohols, and preferably from alcohols having from 1 to 8, and most preferably 1 to 3, carbon atoms. However, there may also be used as catalysts free metals or metal alloys, and preferably for use, at room temperature, the liquid alloys of sodium and potassium. If the catalysts selected for use are present in the solid form, as, for example, are alkali alcoholates which are commercially available, then it is advantageous to disperse the solid catalysts in the starting materials, using therefor suitable dispersing apparatus. Alternatively, the solid catalysts may be first dispersed in an inert solvent, as, for example, an aliphatic or aromatic hydrocarbon and the dispersion so formed added to the starting material. It is also possible to use the alcoholates directly as they are produced and, namely, in the form of their solution in the originating alcohol. Still further, it has been proposed to employ, as catalysts for the re-esterification, organic bases. The catalyst is advantageously employed in amounts of at least about 0.05 to 0.1 weight percent, and preferably in amounts of 0.1 to 0.5 weight percent of catalyst referred to the triglyceride to be re-esterified. 0.1 to 0.5 weight percent of sodium alcoholate, as, for example, methylate, referred to the fat material to be converted, represents a preferred application of the catalyst. It is possible, however, to employ, in accordance with the invention, larger amounts of catalyst, as for example, amounts of up to 1 to 2 weight percent. In the use of re-esterification catalysts other than sodium methylate, equivalent alkali quantities are to be utilized.

As has already been noted, the re-esterification process utilized in accordance with the invention may be either a controlled or an uncontrolled process, or may be a combination of both.

In the case of the uncontrolled re-esterification procedures, which, for example, may be carried out at temperatures of up to 250° C., there may be used less active catalyst, such as, for example, the alkali hydroxides or their soaps. Accordingly, it is not absolutely necessary to insure that the starting materials used in connection with an uncontrolled re-esterification are completely fatty acid or water-free. However, the starting fat materials which are to be subjected to a controlled re-esterification reaction are required to be substantially free of both fatty acids and water; that is, the content of free fatty acid must be adjusted so as not to exceed 0.28 weight percent, and the water content regulated so as not to exceed 0.01 weight percent. Dry soaps or metal hydroxides which may still be present in the starting oil or fat, as, for example, from a previous uncontrolled re-esterification reaction do not deleteriously affect the subsequent re-esterification.

So far as the starting fat material contains considerable amounts of triglycerides having a melting point or melting points above the melting point of the triglyceride fraction sought to be recovered, as, for example, above that of cocoa-butter substitute fat, it is advisable to first wholly or partially crystallize out the aforesaid higher melting constituents and, if indicated, the triglyceride fraction having the desired composition present in the starting fat material and then, following separation of these fractions, the catalyst can be added and the controlled re-esterification carried out. By this procedure, the formation in the re-esterification reaction of even greater amounts of undesirable high melting products is avoided.

However, it may be of particular advantage that the higher melting triglycerides present in the starting fat material are converted by an uncontrolled re-esterification into lower melting fractions. The triglyceride mixture which is obtained as a result of the uncontrolled re-esterification reaction is thereafter cooled and separated. However, it is also possible to follow the uncontrolled re-esterification by a controlled re-esterification reaction, in which case the low temperature catalyst required in connection with the controlled re-esterification is added after the triglycerides falling within the desired melting range and obtained in the uncontrolled esterification reaction have been separated out.

In the formation from palm oil of a cocoa-butter substitute fat, the cooling is carefully controlled and carried out slowly, whereby the highest melting constituents crystallizes out, this being effected at about 30° C. The reaction mixture is then further gradually cooled down to about 20° C., during which cooling the fraction, comprising glycerides which are present in the palm oil and which are similar to the cocoa-butter of natural origin, is crystallized out from the mixture. Thereafter, the conversion catalyst is added to the fat mixture and, under the conditions of the ensuing controlled re-esterification with, if necessary, further cooling down of the conversion reaction mixture to about 16° C., glycerides formed in the conversion having two saturated and one unsaturated fatty acid radical per molecule are crystallized out.

A controlled re-esterification processing is used directly in those cases in which the distribution of the fatty acid radicals on the glyceride molecules corresponds to the statistical equilibrium or deviates but slightly therefrom. Thus, where, for example, the starting material to be processed contains little or no triglycerides, melting at temperatures essentially higher than the triglyceride fraction sought to be produced, then an uncontrolled re-esterification reaction need not be entertained and the processing commenced with a controlled re-esterification.

In carrying out the controlled re-esterification, the catalyst for the esterification insofar as it is not already present in the triglyceride mixture as from a previous uncontrolled re-esterification, may be added to the fat mixture at a point when small amounts of solid triglycerides have already been formed.

It is advisable to provide for distribution of the re-esterification catalyst in the completely molten triglyceride mixture in the uncontrolled as in the controlled re-esterification processes, and thereafter to provide for rapid cooling of the mixture down to the temperature at which the crystallizing-out of the solid triglyceride fractions to be subsequently recovered first begins to take place.

The composition and character of the glycerides which are obtained in the processing are largely influenced by the conditions of the re-esterification and the crystallization. So far as necessary for obtaining from the starting triglyceride mixture, the triglycerides having the highest possible melting point, care is taken to provide time in the controlled re-esterification reaction for the establishment of the esterification equilibrium before crystallizing out the high melting triglycerides formed by heat extraction—i.e., cooling, that is, the crystallization velocity is maintained smaller than the re-esterification velocity. When, however, it is advisable to prevent the crystallizing out of the highest melting triglyceride fraction, as is the case, for example, in the production of a cocoa-butter fat substitute, then the crystallization velocity is maintained greater than the re-esterification velocity. To this latter end, processing is more rapidly effected through the temperature range in which only the higher melting triglycerides are separated out than in the former case, and the mixture is rapidly brought within the temperature range having the desired melting point for crystallizing out. When this temperature has been reached, then the crystallization velocity may be decreased as it is in this temperature range where the establishment of the equilibrium with as complete as possible a crystallizing-out of all of the glycerides melting in this temperature range is desired to be effected.

The re-esterification velocity may be influenced in the controlled re-esterification by selection of the catalyst, the quantity in which it is used and particularly, in the instance of solid catalysts, by the stirring velocity. The re-esterification velocity increases directly with the activity and quantity of the catalyst and with the intensity of the stirring. The crystallization velocity is directly dependent on the temperature conditions. The more rapidly the heat is withdrawn from the triglyceride mixture, the greater is the velocity in crystallization.

The temperature ranges necessary for the re-esterification are somewhat dependent on the composition of the starting fat material. In general, the end temperature reached in the crystallizing out of the solid fat components lies about 5 to 20° C. below the melting point of the desired solid fat component. The reaction time for the controlled re-esterification may fluctuate within wide limits and, in general, lies between 5 and 75 hours. It is possible for the controlled re-esterification to take place much more slowly and, in fact, there have been described re-esterification processes in which the cooling time has been extended over a week and possibly longer. However, it can be appreciated that, for economic reasons, a cooling time of 3 days is hardly ever exceeded.

Various techniques are possible for determining whether the crystallization speed is greater than the re-esterification speed, or vice versa. These techniques are based more or less on an analytical comparision by conventional method of the composition of the solid and liquid constituents and, in simplified form, on the control of the change of the properties of the solid constituent being separated out. Determination of the fatty acid composition of the starting mixture establishes which highest melting glycerides will crystallize out in a theoretically optimally conducted re-esterification. In accordance with the melting characteristics of the triglycerides actually crystallized out and the quantity of triglyceride in the liquid fatty acids remaining and suitable for the formation of high melting glycerides, there can easily be pre-judged the course of the re-esterification and crystallization. Most of the facts to be processed contain fatty acids of different degrees of saturation. Therefore, there may be evaluated through determination of the iodine number whether, and to what extent, lesser amounts of saturated fatty acids are incorporated into the solid constitutents, which saturated fatty acids act to reduce the melting point of the solid constituents. The iodine number may be replaced by and/or supplemented by determining the completely saturated triglycerides present in the solid constituent. If the glyceride mixture to be processed essentially consists of saturated fatty acids of different chain lengths, then the alteration in the saponification number is a gauge of the composition of the liquid and/or solid constituents. Further, changes in the melting points of the two fractions permit a control of the re-esterification and/or crystallization course.

To a great degree the determination of the hardness of the flat separated out by measurement of the penetration is valuable in obtaining information with respect to the composition of the fat. The more uniform the composition of the fat separated out, the greater is its hardness—i.e., the smaller the penetration. To the extent that lower melting fat constituents are separated out, the hardness of the fat decreases and the penetration values increase. Similarly, the determination of the expansion of the separated solid fat may prove a valuable aid for controlling the re-esterification course.

In the practice of carrying out this control there is withdrawn during the re-esterification reaction a glyceride sample of about 100 to 500 grams, to which there is added, under stirring, a sufficient quantity of wetting agent solution to form a dispersion of discrete solid and liquid fat particles in the aqueous wetting solution. This dispersion is placed in centrifugal containers and centrifuged in a conventional laboratory centrifuge and the solid phase separated from the liquid phase. The fractions are dried and the iodine number, saponification number and/or melting point thereof determined in the usual known manner. In order to determine the quantity and nature of saturated triglycerides, the dried solid fraction is dissolved at about 55° C. in a ten-fold quantity of acetone and thereafter cooled to 20° C. under vigorous stirring After about 30 minutes of this temperature substantially all of the saturated triglycerides are crystallized out. The crystallized fraction is separated by filtration, rewashed with acetone having a temperature of 18° C., any adhering acetone being driven off, and the quantity of this fraction determined. Other conventional analytical methods to the same end are equally serviceable, such, for example, as determining the molecular refraction of the solid fraction, etc.

After the re-esterification is complete, the separation of the solid glyceride fraction from the remaining liquid is carried out. The separation process which is advantageously utilized in accordance with the invention is a variation of the known method and is herein designated by the term "re-wetting process" and consists in that the liquid glycerides in immediate coating contact with the surface of the solid glyceride particles are displaced by an aqueous wetting solution—i.e., the solid glyceride particles are re-wetted. The procedure, in accordance with the invention, differs from the known method in that the formation of the soap which is to serve as wetting agent is combined with the formation of the dispersion of solid and liquid glyceride particles in the thusly formed aqueous soap solution. This is carried out by mixing the fat mixture containing catalyst with water, the water reacting with the re-esterification catalyst to form an alkali liquor. It is advisable to add the water in portions using at first a small amount, that is, about 0.1 to 1 weight percent referred to the fat, in order that as concentrated as possible a liquor is formed, the liquor reacting quite rapidly with the fat and only thereafter adding the remainder of the water.

The amount of water to be added to the fat has to be sufficient to form a flowable suspension of solid and liquid fat particles in the aqueous soap solution. The entire amount of water added amounts to at least about one-half the weight of the triglyceride mixture. Generally, the amount of water is regulated with respect to the quantity of the solid glyceride constituents to be separated out. If the quantity of solid glyceride constituent to be separated out amounts to about 30 weight percent of the entire glyceride mixture, then it suffices to use approximately the same amount of water as the glyceride mixture present. When a content of 50 to 60 weight percent of solid glycerides is separated, then, advantageously, there is used twice the weight of water referred to the entire glyceride mixture. It is possible, of course, to use larger amounts of water and up to approximately 5 times the amount of glyceride mixture present, care being taken that thereby the concentration of the soap solution is not decreased below the critical limit required for satisfactory wetting and emulsifying.

There may be added to the water salts which do not combine with the soap to form any insoluble precipitates. Examples of suitable salts include sodium chloride, sodium sulfate, etc. In addition, there may be added any other conventional emulsion stabilizers as, for example, methylcellulose, carboxymethylcellulose, cellulose ethers, cellulose sulfates, alkoxysulfonic acids, alginates, and other water-soluble derivatives of high molecular carbohydrates, as, for example, cellulose derivatives, starch derivatives, polyacrylates or polymethacrylates.

In the conversion of alkaline re-esterification catalyst into soap, as takes place simultaneously with the production of the dispersion of the discrete solid and liquid triglyceride particles, in aqueous soap solution, care must be taken to insure that the soap is not precipitated out by virtue of the hardness of the water used. As long as the degree of water hardness is kept within tolerable limits—i.e., if the unprecipitated water-soluble alkali soap remaining suffices to maintain the dispersed state, the degree of water hardness need not be taken into account. However, if the precipitation of insoluble soaps goes beyond this point, then it is advisable to use previously softened water or to add to the water substances which counteract hardness or which are capable of converting water-insoluble metal soaps into water-soluble alkali soaps. Included among these substances are the complex-forming alkali phosphates, as, for example, alkali-, tripoly-, tetrapoly- and hexameta-phosphates, as well as other alkali poly- and meta-phosphates. Also suitable, are the alkali salts of organic complex formers, as, for example, of nitrilo-tri-acetic acid, ethylenediamine-tetra-acetic acid, as well as the alkali salts of other aminopolycarboxylic acids. The aforesaid substances are added to the reaction water in all those instances when alkaline earth compounds have been used as re-esterification catalysts, as, in these instances, the entire soap formed on addition of water would be present as water-insoluble alkaline earth soaps. It is possible to add the complex-forming substances directly to the water which is present for the reaction between the re-esterification catalyst and the fat. However, it is also possible to add the complex-forming substances at a later point. As, in connection with the soap formation, it is preferable to introduce the complex-forming substances in admixture with a small amount of water to facilitate obtaining high concentrations thereof at first, and then to further dilute the soap solution which is obtained.

For controlling the re-wetting process, as, for example, the optimum soap concentration or the optimum water quantity, the following procedure may be followed:

To the mixture of solids and triglycerides to be separated, a fat soluble dyestuff is added and then in the manner already described a dispersion of the discrete solid and liquid fat particles in aqueous soap solution is prepared. The dispersion is then subjected to centrifugal treatment in a laboratory centrifuge. As the fat dyestuff, by preference, colors the liquid triglyceride, the solid triglyceride takes on as little coloring as possible and is possibly recovered in pure white form. By varying the conditions of the re-wetting, as, for example, the concentration of the soap, the quantity of the water or the other components of the aqueous soap solution, then it is possible to appreciate from the changes in color uptake of the solid fraction, those conditions which must necessarily be established in order that as light color as possible—i.e., a substantially pure white triglyceride—be recovered.

So far as the solid glycerides to be separated are already present in solid form at completion of the re-esterification, the separation of the solid fat may be directly instituted. However, it may also be advantageous to heat the glyceride mixture after first adding thereto small quantities of water in order to thereby accelerate the formation of soap. Following such heating, the crystallizing-out of the higher melting fat components must once more be carried out. This modification of the process, in accordance with the invention, offers the possibility to separate first, with the aid of the re-wetting treatment, fat fractions having undesirably high-melting points, as, for example, fat fractions containing large quantities of completely saturated triglycerides and, thereafter, to separate out by cooling from the liquid fat remaining after the first separation, the fat fraction falling within the desired melting range, and thereafter to again use the soap solution formed in the destruction of the re-esterification catalyst to continue the separation.

If, in the solid fat fraction recovered, there are still present undesirable high-melting fat constituents, these, together with the desired fat fraction contained in the fat portion remaining liquid, may be separated out in a renewed separating operation. This operation may be carried out in any desired manner. Most advantageously, the dispersion of the solid fat constituents in the aqueous wetting agent solution is heated either by heating the fat fraction to be processed to the temperature required for effecting the separation or, alternatively, by completely melting the fat and thereafter cooling the molten fat to the separation temperature. In either case, the undesirably high melting glycerides are obtained in solid form and the glyceride fraction having the desired melting characteristics as a liquid.

The solid triglycerides remaining after the separation of the liquid triglycerides may be separated off from the aqueous soap solution by filtering or by centrifuging after first heating to effect melting of the solid constituent dispersed there. If the separation of the solid or liquid triglycerides from the aqueous soap solution poses any difficulties, the separation may be facilitated by decreasing the soap concentration through acidification of the solution. The free fatty acids thereby formed go over into the triglyceride fraction and must, if necessary, be removed therefrom by alkali refining. This alkali refining may be avoided if synthetic capillary active substances and preferably of the sulfate or sulfonate type are added to the aqueous soap solution. Examples of synthetic capillary active substances which have proved suitable are the fat alcohol sulfates, alkylbenzenesulfonates and, in particular, tetrapropylenebenzenesulfonate. Addition of these synthetic capillary-active substances results in an easier separation of the higher melting triglyceride fraction dispersed in the aqueous soap solution. So far as this triglyceride fraction is melted before the separation, the optimal conditions for the separation operation may be easily established and, in particular, the concentration of soap and also the synthetic capillary active substances. These conditions can be determined as set out above by utilizing in a sample of the dispersion of the melted-down triglycerides a fat dyestuff, as set out above, and then only is the separation carried out.

The glycerides recovered in carrying out the process in accordance with the invention and having melting points which are either too high or too low may be recirculated into the process as starting material.

Although the production of cocoa-butter substitute fats has been particularly emphasized in describing the process of the invention, the process may not only be advantageously used for the production of fat fractions melting within the range of cocoa-butter, but there may also be produced, in accordance with the invention, fat fractions, the melting point of which lies essentially above body temperature. Such fats are used, for example, as additions to dietary edible fats as, for example, dietary margarines which are required not to contain any hard fats produced by hydrogenation procedures. In addition, there may be produced, in accordance with the invention, drawing fats as are used in the bakery industry and which are not required to melt as sharply as cocoa-butter but which may not contain any constituents melting substantially above 37° C.

The description of the process, in accordance with the invention, has been given with an emphasis on those cases in which there is produced a triglyceride which is solid at normal temperature and preferably a cocoa-butter fat substitute. Of course, the process, in accordance with the invention, may also be used to considerable advantage for producing triglyceride mixtures liquid at normal temperatures and having specified properties. In the winterizing of edible oils there are separated, for example, the products melting at higher temperatures. These triglycerides melting at higher temperatures do not consist exclusively of saturated fatty acids, so that, to the remaining liquid fat, there are lost in the separation of the higher melting solid constituents, unsaturated fatty acids. In accordance with the invention, however, there may first be carried out a controlled re-esterification utilizing the starting fat with the object of replacing as far as possible the unsaturated fatty acid residues by saturated fatty acid residues present in the higher melting constituents. If, thereafter, the higher melting triglycerides present are separated out, a higher yield of the fraction is achieved without, however, decreasing the resistance thereof to cold.

The melting points further identified herein as rising, flowing, clarifying, and dropping points are determined according to the "German Standard Methods for the Testing of Fats, Fat Products and Related Materials"—"Deutsche Einheitsmethoden zur Untersuchung von Fetten, Fettprodukten and Verwandten Stoffen," C IV 3 a and C IV 3 b.

The present invention is further discussed in the following examples which are illustrative but not limitative thereof:

*Example 1*

The re-esterification of the fat is carried out in a 12 m.$^3$ downwardly tapering vessel provided with a cooling jacket. The vessel contents are kept moving by means of a slowly running anchor stirrer, the stirrer being characterized in that the stirring shaft extends downwardly to the lowest point of the container and in that the stirring arms thereof are approximately U-shape and on movement of the stirrer are caused to rotate within a small distance of the wall of the vessel. 5 tons of deacidified, bleached, and dried coconut oil ($n_D^{40}$=1.4491; acid number=0.08; water content=0.005%; melting point (on rising temperature)=23.9° C.; iodine number=9.5) are heated in a vessel as just described to 70° C. with 0.3 weight percent of a very fine sodium methylate. The vessel contents are stirred under nitrogen for 30 minutes at this temperature. After this time there has been established in the liquid phase the re-esterification equilibrium which is recognizable by the rise of the melting point, which, at the end of the 30-minute period, amounts to 26.9° C. and which does not thereafter further alter. The mixture is then cooled to 29° C. within an hour under stirring and, after cooling, stirred for a further period of time without any additional cooling. As a result of the crystallization which takes place, the temperature rises during the course of an hour to 30° C.

In order to regulate the course of the ensuing controlled re-esterification, there are removed during the re-esterification several 100 g. samples of fat which are each stirred for 30 minutes with 100 ccm. of 3% sodium sulfate solution having the same temperature as the fat sample. There is thereby formed a dispersion of discrete solid and liquid fat particles in the sodium-sulfate-soap solution. On subjecting this dispersion to centrifugation in a laboratory centrifuge, there are separated an oily phase and dispersion of solid fat particles in aqueous solution. The aqueous phase is separated off from the oily phase and the solid constituents separated from the aqueous phase by heating and acidifying the aqueous medium. The higher melting fraction which is thus obtained is separated off from the acid aqueous phase, dried, and the melting point (on rising temperature) of this phase determined. The further crystallization of the fat mixture to be re-esterified is thereafter conducted so that the melting point (on rising temperature) of the solid fat constituents present at an end temperature of the controlled re-esterification of 25° C. does not fall below 30° C. To this end the mixture is cooled over 5 hours from 30 to 27° C. and over a further 5 hours from 27 to 26° C., and thereafter over a period of 10 hours from 26 to 25° C. During this period samples are removed on reaching 26 and 25° C. temperatures and the melting points (on rising temperature) of the solid constituents recovered as set out above are determined and found to be 35.9 and 32.0° C., respectively. The fat mixture is then stirred for a further 4 hours at 25° C. In order to prepare the dispersion there are added to the fat mixture 5 tons of a 3% sodium sulfate solution having a temperature of 25° C., which has been prepared using tap water of 6° German hardness. The sodium sulfate fat mixture is stirred for an hour and there is obtained at the end of that period a dispersion of discrete solid and liquid fat particles in an aqueous soap solution. The dispersion is subjected to centrifugation in a solid jacket centrifuge of conventional construction and therein additionally separated into phases of differing specific weight, there being obtained as the lighter phase the essentially water-free oil and, as the heavier phase, a dispersion of the solid fat particles in the aqueous phase solution. This latter dispersion is broken up through heating into an aqueous soap solution and a liquid fat. The liquid fat thus obtained, which amounts to 2.3 tons, has a melting point (on rising temperature) of 30.5° C., a melting point on flowing of 31.8° C., a melting point on clarifying of 32.4° C., and an iodine number of 6.5 and represents the desired cocoa-butter substitute fat fraction.

*Example 2*

5 tons of a coconut oil fraction, as set out in Example 1, is at first subjected to an uncontrolled re-esterification following the conditions described in that example—i.e., in the liquid phase. The subsequent controlled re-esterification is carried out more rapidly than that of Example 1, with the objective of repressing the formation of highest melting point triglycerides in favor of the lower melting triglycerides—i.e., less time is allotted for the setting-in of the re-esterification equilibrium in the fat than in the procedure carried out in Example 1. In this connection, the fat mixture is cooled after having reached a temperature of 30° C. within 2 hours to 26° C., and, within a further 2 hours to 25° C. Thereafter, the fat is stirred for a further 4 hours at a temperature of 25° C.

In order to determine the most favorable conditions for the wetting treatment, a sample of 100 g. of the re-esterified fat is dyed with fat red, thereafter treated with 100 m.$^3$ of the same 3% sodium sulfate solution as used in Example 1. After 30 minutes of stirring, the dispersion which is formed is divided and samples of the separated portions are treated with different quantities of tetrapropylenebenzenesulfonate. In the separation of the dispersion in a laboratory centrifuge, it is found that the solid fraction obtained, using an aqueous phase having an additional content of 0.3 weight percent tetrapropylenebenzenesulfonate is pure white and thus oil-free.

The main amount of the re-esterified fat is, in the manner described in Example 1, dispersed under stirring in a 3% sodium sulfate solution. However, in this instance, with reference to the fat being treated, there is used 1.5 times the weight of the fat of the sodium sulfate solution. To the dispersion thereby obtained, there is added sufficient tetrapropylenebenzenesulfonate so that the resulting aqueous solution contains 0.3% weight thereof.

The dispersion is thereafter further processed, as is described in Example 1, and 3.9 tons of a solid fat having a melting point (under rising temperature) of 28.2° C. and an iodine number of 9.0 recovered. This solid fat fraction is softer than that produced in Example 1 and is suitable for use in the preparation of summer margarine.

*Example 3*

5 tons of palm oil deacidified by distillation (acid number=1.0, iodine number=52, water content=0.006 weight percent) are subjected to an uncontrolled re-esterification using the condition as set out in Example 1. The fat obtained is cooled over one hour to 41° C. and the cooling terminated. As a consequence of the ensuing crystallization, the temperature of the fat rises within 2 hours to 47° C.

With the object of producing a solid fat fraction which, when analyzed, consists of about 1/3 completely saturated triglycerides and of about 2/3 triglycerides having 2 saturated and 1 unsaturated fatty acid radicals, the further crystallization of the fat is carried out so that the iodine number of the solid fat constituent, separated off at 20° C., is not greater than, and not essentially less than, 29. For this purpose, the fat is cooled within 48 hours from 47 to 20° C. At 32° C., 25° C., and 20° C., samples are taken off and, on analysis of these samples, iodine numbers of 12, 18, and 25, respectively, are found. Upon attaining a temperature of 25° C. the re-esterification is terminated by stirring the fat with 7.5 m.$^3$ of a solution having a temperature of 20° C., containing 0.5 weight percent tetrapropylenebenzenesulfonate and 4 weight percent sodium sulfate. The further working up of the fat is carried out as in Example 1.

2 tons of a high melting fraction are obtained having a melting point (under rising temperature) of 54° C. and an iodine number of 26, and 3 tons of liquid fat constituents having a melting point (under rising temperature) of below 10° C. and an iodine number of 63.

The high melting constituents are suitable as hard fat components for plastic fats, for dietetic margarines and for the manufacture of purely vegetable unhardened drawing fats and drawing margarines. In addition, by separating out the lower melting constituents which are contained in the solid fat fraction, an excellent cocoa-butter substitute fat is obtained. The liquid phase is useful as a liquid edible oil and, for example, can be advantageously employed in the preparation of mayonnaise, and also as a vegetable oil in the use or the manufacture of margarines.

*Example 4*

5 tons of the same palm oil as processed in Example 3 are re-esterified (uncontrolled), following the reaction conditions which are set out in Example 1, for a period sufficiently long for re-esterification equilibrium to become established in the liquid phase. Thereafter, the mixture is cooled over one hour to 41° C., at which temperature crystallization sets in. The cooling is then stopped and the temperature rises, by virtue of the crystallization taking place within 2 hours, to 47° C.

In order to prepare a solid fraction softer than that which is recovered in Example 3, the following procedure is observed:

The fat is cooled within 5 hours from 47° C. down to 20° C. and held at this temperature for a further 4 hours.

By the procedure described in Example 2, it is determined that optimal separation is achieved in this instance using 1.5 times the quantity referred to the fat material of an aqueous solution containing 4 weight percent sodium sulfate and 0.6 weight percent tetrapropylenebenzenesulfonate. In view of such fineness the mixture of separated and of liquid glycerides is admixed under stirring with 7.5 m.$^3$ of a solution containing 4 weight percent sodium sulfate and 0.6 weight percent tetrapropylenebenzenesulfonate having a temperature of 20° C.

The dispersion which is formed is stirred for a further 30 minutes and then subjected to centrifugation in a continually operated solid jacket-type centrifuge. There is obtained 53 weight percent of a higher melting glyceride having a melting point (under rising temperature) of 44° C. and an iodine number of 41. This fraction is suitable as the solid component of summer margarine. The liquid oil fraction has a melting point (under rising temperature) of 20° C. and an iodine number of 64.0.

*Example 5*

For winterizing cotton-seed oil, 10 kilos of cotton-seed oil (content of free fatty acids=0.056 weight percent, water content=0.006 weight percent, $n_D^{40}$=1.4650) are re-esterified in a vessel provided with a cooling jacket and a stirrer, and thereafter dispersed by means of an aqueous sodium sulfate solution. The re-esterification is carried out by heating the oil to 40° C. in admixture with 0.4 weight percent of a very fine sodium methylate. Thereafter, the oil mixture is cooled over 20 minutes from 40 to 25° C. and within 48 hours from 25 to 0° C. As the amount of catalyst utilized is greater than that in the previous examples and, furthermore, as 48 hours are made available for the separation of the comparatively small quantities of solid constituents as compared to the time period in the previous examples, the re-esterification equilibrium is believed to extensively become established during the controlled re-esterification.

In the preliminary tests carried out in order to determine the optimal re-wetting conditions, it is found that the soap concentration required is comparatively high. Accordingly, the fat is treated with 1.5 times its weight of a 3 weight percent sodium sulfate solution containing 0.5 weight percent tetrapropylenebenzenesulfonate and sufficient sulfuric acid so that the concentration of the soap which is formed amounts to 0.2 weight percent. The dispersion is separated in a conventional continuously-operating solid-jacket centrifuge and the resulting phases are worked up. 8.8 kilos of liquid oil having an iodine number of 107 are obtained which, when maintained for 5 hours at 0° C., do not shown any sign of separation. From the aqueous phase there is recovered 1.2 kilos of higher melting constituents having an iodine number of 67.

In a winterizing procedure carried out in known manner, in which the starting oil is cooled within 72 hours while carefully stirring the oil from 15 to 0° C. and the coarse crystals thereby formed separate in a filter press, only 73 weight percent of oil is recovered and, in addition, 27 weight percent of solid constituents.

*Example 6*

In this example there is described the preparation of a solid fat which can advantageously be utilized in the manufacture of suppositories and, therefore, is required to melt below 37° C., and, furthermore, must be characterized by sufficient plasticity to allow other medicaments to be easily worked into the fat mass.

7 tons palm kernel fat ($n_D^{40}$=1.4510, content of free fatty acids=0.05 weight percent, water content=0.006 weight percent, iodine number=18.5) are processed under conditions regulated so that the re-esterification equilibrium cannot be established during the crystallizing-out of the higher melting point solid constituents. This is accomplished by decreasing the quantity of sodium methylate catalyst to 0.2 weight percent and following carrying out the uncontrolled re-esterification at 70° C. for 30 minutes, cooling the mixture within 4 hours to 28° C., during which time marked crystallization sets in and the temperature of the fat rises to 30° C. The further crystallization is carried out so that the iodine number of the fat components separated at 25° C. fall within the range of 10–12. This is obtained by cooling of the fat from 30 to 25° C., within 48 hours.

For the production of the dispersion there is utilized 20 tons of a previously obtained aqueous solution containing 0.3 weight percent soap and 3.5 weight percent sodium sulfate. After stirring for 30 minutes, the dispersion is centrifugally separated, using a centrifuge of the type employed for separating soap stock in oil refining processes. There is obtained 30 weight percent of solid fat having an iodine number of 10.9 and 70 weight percent of liquid fat having an iodine number of 21.8.

*Example 7*

30 kilos of a refined, bleached, and dried coconut oil ($n_D^{40}$=1.4491, acid number=0.09, water content=0.006 weight percent) are re-esterified (uncontrolled) as described in the previous examples, after addition to the fat of 0.3 weight percent of sodium methylate for an hour at 70° C. The fat mixture is cooled within 2 hours to 30° C. This is accomplished by returning the fat following the re-esterification from a storage container over a scraper cooler having a capacity of 4 liters back into the storage container. (The referred-to apparatus is described in Germany DAS 1,088,490.) The cooling velocity is controlled so that the temperature is lowered over 23 hours from 30 to 25.5° C. Additionally, there are added, at the starting of the cooling, 100 grams of solid fat components obtained in a previous procedure as seed crystals. The fat mixture is then recycled through the device described for a further 20 hours at 25.5° C., during which time there are formed well-defined needle-shaped crystals.

In testing to determine the optimal re-wetting conditions by treatment of the dispersion formed from the fat and the soap solution using a fat dyestuff, as set out above, a wetting agent solution having a decreased soap content is found to be optimal. As a result, the total quantity of fat is treated with 30 kg. of a 3% sodium sulfate solution having a temperature of 23.5° C., to which there has been added 2.3 kg. of 1% sulfuric acid. The dispersion formed is separated, following stirring for 30 minutes, in a solid-jacket centrifuge. In the working up of the phases recovered from the centrifuge treatment, there are obtained 10.6 kg. of a very sharply melting hard fat having a melting point (on flowing) of 30.2° C. and a melting point (on clarifying) of 30.6° C. and 39.4 kg. of a liquid fat product, suitable for admixing with a high melting point triglyceride, as, for exmple, a tri-stearin, or treatment in a further re-esterification.

*Example 8*

31 kg. of de-acidified, bleached, and dried palm-kernel fat are re-esterified (uncontrolled) after addition to the fat of 0.5 weight percent of a very fine sodium ethylate for a period of an hour at 70° C. Thereafter, the fat is cooled utilizing therefor the apparatus described in the previous example stagewise in a first stage within 3 hours to 31° C. and then within a further 25 hours to 26.5° C. After addition of 100 grams of finely distributed seed crystals obtained from a previous run to the mixture, there is formed over 22 hours at 26.5° C. well-formed crystals. In this run, re-esterification and crystallization velocities are not controlled.

The fat mixture, which is obtained, is dispersed with 31 kg. of a 3% sodium sulfate solution having a temperature of 26.5° C., to which there has been added 3.1 kg. of a 1% sulfuric acid, such solution having been determined in previous testing to be optimal.

After 30 minutes of stirring the mixture, the dispersion formed is, as in previous examples, subjected to centrifugal treatment in a solid jacket-type centrifuge and the phases obtained worked up. There are recovered 10.1 kg. of hard fat having a melting point (on flowing) of 36.1° C. and a melting point (on clarifying) of 36.4° C. The liquid product which is recovered amounts to 20.9 kg. and is suitable for use as the liquid constituent for further re-esterification processes.

*Example 9*

A mixture of 80 g. dehydrated and hardened soybean oil (iodine number=1, content of free fatty acids=0.1 weight percent) and 120 g. distillatively deacidified palm oil (iodine number=about 50, content of free fatty acids=0.23 weight percent) after addition thereto of 1 g. of finely divided solid sodium-methylate, are heated to 70° C. for an hour. The uncontrolled re-esterification results in the formation of a glyceride mixture containing about 40% tri-saturated, about 40% bi-saturated and about 20% bi- and tri-unsaturated glycerides. In order to inactivate the catalyst, 0.1 g. of water is added and dispersed in the oil by thorough stirring. The mixture is thereafter cooled over 7 hours under stirring from 46° C. to 38° C., and in the cooling there is crystallized-out a great part of the higher-melting constituents contained in the fat.

The mixture of solid and liquid fat which results is then treated at 38° C. with a solution of 16 g. $Na_2SO_4$ and 0.45 g. $H_2SO_4$ in 400 g. water. Over a period of three hours, during which the mixture is neither heated nor cooled but stirred continuously, the alkali resulting from the catalyst saponifies a portion of the glycerides forming soap. There accordingly results a dispersion of discrete solid and liquid glyceride particles, in the aqueous solution. On centrifuging a small portion of this dispersion, treating the same with fat dye as set out above and subjecting the dye-treated dispersion to centrifugal treatment, it is seen that the liquid material in part is still retained in the solid fat material. Accordingly, the dispersion is further treated with 10 cc. of an aqueous solution of 1.6 g. alkyl-benzene-sulfonate. The dispersion which is thus formed is centrifugally separated into a lighter aqueous phase and into a heavier aqueous dispersion of solid fatty materials. On working up the fat, 87 g. of oil and 111 g. of solid glycerides are obtained. The iodine number of the solid glyceride is equal to 21.

The glyceride in oil form obtained is cooled under stirring over a period of 20 hours from +40 to +15° C., as a result of which a part of the fat is crystallized out. The mixture of liquid + solid fat is admixed with stirring with an aqueous solution containing 2% alkyl-benzene-sulfonate and 4% sodium sulfate in an amount equal to twice its weight. The dispersion which is formed is centrifugally separated into a lighter liquid phase and into a heavier phase suspension composed of a solid fat particle in the aqueous solution. By working up the latter phase, there are obtained 59 g. of a solid fat fraction having an iodine number of 37 and an expansion of 1200 at 20° C.

The solid fat so characterized is suitable for use as cocoa butter substitute and additionally suitable for use in combination with natural cocoa butter. The liquid fat (drop point 12° C., iodine number=56) obtained in the second separation step, is suitable for use as a starting liquid oil in margarine production.

The solid fat recovered in the first separation may be advantageously recycled into the process, instead of the hardened soybean oil used as starting material or alternatively used in admixture therewith. However, it is possible to also separate this fraction by repeating the separation process but with somewhat higher temperatures into a higher- and lower-melting fraction, the lower-melting product thereby recovered being suitable as a cocoa butter substitute fat.

There may be most advantageously used as starting materials the natural triglycerides which possibly have already been processed by hydrogenation to form edible fats, after carrying out the conventional purification treatment thereof. A very detailed listing of the fats suitable in this connection is set out in A. E. Bailey: "Industrial Oil and Fat Products," New York, 1951. On pages IX and X of the index of this reference, there appears a classification of the fats, the so-called "lauric acid oils," being of particular practical interest. This group includes such fats as coconut-palm-kernel and American palm-kernel-oil, as well as animal derived fats as, for example, lard and tallow and also the oleic acid-linoleic acid fats, as, for example, cotton seed oil, peanut oil, olive oil, palm oil, sunflower oil, sesame oil, corn oil, etc. Similarly, oils of marine origin and/or their hydrogenation products are suitable for use in the processing of the invention. The fatty acids of the triglycerides should contain 10–20, and preferably 12–18 carbon atoms, in their molecules. In the production of cocoa butter substitute fat products, there are particularly concerned those starting materials predominately containing $C_{16}$–$C_{18}$ fatty acids.

We claim:

1. In the process for the production of fats having melting points differing from the starting fat material, by intra- and inter-molecular rearrangement of the fatty acid radicals present in the molecules of said fat and separation of the solid fat fraction from the liquid fat fraction thereby formed by crystallization, the steps which comprise contacting a fat having a tri-glyceride structure containing bound fatty acid radicals with 0.05 to 2.0 weight percent referred to the rearrangement mixture of an alkaline molecular rearrangement catalyst selected from the group consisting of alkali metal alcoholates of lower alkanols, alkaline earth metal alcoholates of lower alkanols, alkali metals and metal alloys consisting of sodium and potassium, at a temperature of about 5 to 20° C. below the melting point of the solid fat desired to be produced, to effect the intra- and inter-molecular rearrangement of the fatty acid radicals in the molecules of the fat, cooling the rearrangement mixture to form a mixture of catalyst, solid phase fat molecules and liquid phase fat molecules, adding to said mixture water in a quantity of from ½ to 5 times the amount of rearrangement mixture present and sufficient to convert the alkaline catalyst into a fluid phase soap containing dispersed therein the solid phase and liquid phase fat fractions, subjecting the said dispersion to centrifugation for separating a lighter phase comprising the liquid fat phase fraction and a heavier phase comprising the fluid phase soap containing the solid fat phase fraction distributed therein.

2. Process according to claim 1 wherein said molecular rearrangement is effected by bringing said reaction mixture slowly to the temperature range having the desired melting point for crystallizing out so as to maintain the crystallization velocity less than the rearrangement velocity.

3. Process according to claim 1 which comprises the additional step of separating said heavier phase fraction into a fluid aqueous soap phase and a solid fat fraction by heating said heavier phase fraction, thereafter mechanically separating the fluid aqueous soap phase from the molten fat fraction thereby formed and cooling said molten fat fraction to effect the solidification thereof.

4. Process according to claim 1 wherein the water additionally contains a water-soluble salt selected from the group consisting of sodium chloride and sodium sulfate.

5. Process according to claim 1 wherein said molecular rearrangement is effected by bringing said reaction mixture rapidly to the temperature range having the desired melting point for crystallizing out so as to maintain the crystallization velocity greater than the rearrangement velocity.

6. Process according to claim 1 wherein the water addition is made in two stages, 0.1–1% by weight of the total quantity of water being added in the first stage, and the balance of the water being added in the second stage.

7. Process according to claim 1 wherein the rearrangement mixture is maintained within the temperature range wherein rearrangement equilibrium is maintained.

References Cited by the Examiner

UNITED STATES PATENTS

| | | | |
|---|---|---|---|
| 2,442,531 | 6/1948 | Eckey | 99—118 XR |
| 2,733,251 | 1/1956 | Hawley et al. | 99—118 XR |
| 2,738,278 | 3/1956 | Holman et al. | 99—118 |
| 3,027,390 | 3/1962 | Thurman | 260—425 |

OTHER REFERENCES

Bailey: "Industrial Oil and Fat Products," 1951, Interscience Publ. Inc., N.Y., pages 357 and 358.

CHARLES B. PARKER, *Primary Examiner.*

TOBIAS E. LEVOW, *Examiner.*